US006037019A

United States Patent [19]

Kooyer et al.

[11] Patent Number: 6,037,019

[45] Date of Patent: Mar. 14, 2000

[54] PROCESS FOR MAKING PARTICLE-COATED SOLID SUBSTRATES

[75] Inventors: Richard L. Kooyer, Hastings, Minn.; William A. Hendrickson, Stillwater, Md.

[73] Assignee: 3M Innovative Properties Company, Saint Paul, Minn.

[21] Appl. No.: 08/981,997

[22] PCT Filed: Aug. 16, 1996

[86] PCT No.: PCT/US96/13268

§ 371 Date: Jan. 8, 1998

§ 102(e) Date: Jan. 8, 1998

[87] PCT Pub. No.: WO97/07900

PCT Pub. Date: Mar. 6, 1997

Related U.S. Application Data

[63] Continuation-in-part of application No. 08/518,640, Aug. 24, 1995, abandoned.

[51] Int. Cl.[7] .................................................... B29C 35/08

[52] U.S. Cl. .......................... 427/598; 427/185; 427/190; 427/191; 427/192; 427/195; 427/201; 427/434.1; 427/434.7; 427/435; 427/436; 427/601

[58] Field of Search .................................... 427/598, 601, 427/185, 190, 191, 192, 195, 201, 434.1, 434.7, 436, 435

[56] References Cited

U.S. PATENT DOCUMENTS 3,848,363 11/1974 Lovness et al. .
3,892,908 7/1975 Lovness .................................. 428/329
4,024,295 5/1977 Chase et al. .
4,612,242 9/1986 Vesley et al. ........................ 428/313.9
5,163,975 11/1992 Martin ...................................... 51/293
5,232,775 8/1993 Chamberlain et al. ................. 428/323
5,273,782 12/1993 Sagawa et al. ......................... 427/242
5,389,434 2/1995 Chamberlain et al. ................. 428/323
5,658,510 8/1997 Carraro et al. ............................ 264/70

FOREIGN PATENT DOCUMENTS 2 235 738 1/1975 France .

OTHER PUBLICATIONS

Machine Design vol. 48, No. 6 Mar. 1976 Cleveland US, p. 36, XP002023004 "*Flying magnets coat complex parts*".

"Mechano Fusion System", product information from Hosokawa Micron International Inc. (No date avail.).

Bulletin P–1, "Process Equipment, Powder Surface Modification", Bepex Corporation, 1989 (No month avail.).

*Primary Examiner*—Bernard Pianalto
*Attorney, Agent, or Firm*—Carolyn V. Peters; Melanie Gover

[57] ABSTRACT

The present invention relates to a process for adhering a powder to a substrate. The process includes the steps of: a) providing an oscillating magnetic field, b) continuously introducing into the magnetic field coating material, a substrate, and a means of affixing the coating material to the substrate by forming a fluidized bed of at least the coating material and providing sufficient force to cause the coating material to adhere to the surface of the substrate, and c) continuously collecting the coated substrate.

33 Claims, 3 Drawing Sheets

PROCESS FOR MAKING PARTICLE-COATED SOLID SUBSTRATES

This is the U.S. National Stage of PCT International Application No. PCT/US96/13268 filed Aug. 16, 1996 which is a continuation in part of U.S. application Ser. No. 08/518,640 filed Aug. 24, 1995 (now abandoned).

FIELD OF THE INVENTION

The present invention relates to process for making various substrates having particulate coatings thereon formed by utilizing magnetic forces to propel the particulate onto the substrate.

BACKGROUND OF THE INVENTION

Powder coating is a relatively simple process that has some strong economic advantages in two broad application areas and some limitations in each of the areas. Powder coating involves the affixing of a powder, previously selected for its property enhancing feature and finely ground, onto the surface of a substrate to be coated as a layer of powder and then, if a continuous coating is desired, subjecting the powder coated substrate to heat which melts the powder layer, allows it to flow, and fuses it into a continuous coating. Powder coating is a dry process that has significant energy and labor cost reductions, high operating efficiencies, and environmental safety advantages over liquid coating processes because the powder coating process does not require a volatile carrier for the purposes of coverage and flow. Powder coating is used in two broad application areas, applying coatings onto large surfaces and applying powder onto particulate substrates. Different powder coating methods to adhere the powder to the desired surface are used in the different areas.

There is a large demand to apply decorative finishes and protective coatings onto metal surfaces. Large area powder coating is an economical and environmentally safe method of applying coatings such as these. Achieving adhesion of the powder onto the surface of the substrate is usually done using a fluidized bed, plastic flame-spraying, or electrostatic spraying.

In the fluidized bed method, the thermoplastic or thermoset powder is placed in a suitable container and fluidized. The part to be coated is heated and dipped into the bed of fluidized powder. Upon contacting the heated part, the powder melts and adheres. However, particles less than about 100 μm generally do not fluidize well, parts are usually of metal so deformation will not occur with heating, the powder is generally limited to thermoplastic materials, the container must be full of fluidized powder, and the minimum coating thickness is typically over 250 μm.

In plastic flame-spraying, the thermoplastic powder is transported through a combination air/propane flame held over a surface to be coated. The molten powder contacts the surface and adheres. With this method, small and intricately shaped parts are difficult to coat, coatings are limited to thermoplastic materials, and the melting of a thermoplastic powder in a flame can degrade some polymers and possibly cause the formation of hazardous gases.

In electrostatic spraying, a high voltage source is used to establish a stable corona field in a powder spray gun. Powder particles are dispersed in an air stream and passed through the corona discharge area where they become electrostatically charged. The charged cloud is then directed to the grounded substrate, to which each particle is drawn by the positive-negative electrical attraction. However, generally only metal substrates can be coated, powder is limited to thermoset materials, the maximum coating thickness is typically about 75 μm due to insulation of the metal surface and the electrostatic repulsive forces as the powder layer grows, and intricately shaped surfaces are difficult to coat.

There is an increasing demand for surface modification by particulate coating to improve such characteristics as flowability, dispersibility, wettability, bulk density, color, and performances in electrical fields. There is also a desire to save on usage of high priced and/or rare materials by bonding these materials onto lower cost carriers, to create new composite particulate materials and to shorten production steps and cycle times. Small area powder coating is an economical and environmentally safe method of accomplishing these modifications. Applications where small area powder coating is done include, for example, toners, cosmetics, pharmaceuticals, dyes, paints, ink, ceramics, powdered metals, food flavors, fine chemicals, catalysts, electromaterials, and biochemical materials. Achieving adherence of the powder to the surface of the core particulate is usually done by a mechanical fusion method.

In mechanical fusion, powder and core particles are usually premixed in predetermined ratios. The mixture is then fed into a chamber that may be heated. Rapidly moving parts in the chamber collide with the powder and core particles, causing them to collide at such velocities that they fuse to each other. Multiple passes may be used to create a thicker coating layer on a core particle or multiple different layers. Limitations include, excessive machine wear if the core particles are abrasive, a tendency to fracture hard core particles or break fragile core particles, difficulty in coating intricately shaped small articles, and difficulty in coating continuous articles such as fiber tow.

Many of the limitations of the large area coating methods and the core particulate powder coating method are overcome by coating magnetically propelled particles onto solid substrates. The substrates can be simple or very complex shaped articles of plastic, metal, or any hard material. The powders can be plastic, metal, or inorganic material. The process involves placing a preweighed amount of powder, small particulate magnetic elements and a substrate to be coated in a confined space. The contents within the confined space are subjected to a magnetic field of sufficient intensity to cause the small magnetic elements to move and thereby cause the powder to impinge upon and to coat the exposed surface. However, the process is a batch process the types of substrates and powders that can be used are limited. Additionally, in many instances using a white powder coating with small particulate magnetic elements results in coatings that are discolored and/or blackened.

SUMMARY OF THE INVENTION

The present invention provides a process for adhering a powder to a substrate, comprising the steps of:

a) providing an oscillating magnetic field, b) continuously introducing into the magnetic field coating material, a substrate, and a means of affixing the coating material to the substrate by forming a fluidized bed of at least the coating material and providing sufficient force to cause the coating material to adhere to the surface of the substrate, and c) continuously collecting the coated substrate.

The affixing means may be provided by magnetic elements or the magnetic character of the coating material or substrate if magnetic. A unique feature of the present invention is the use of coated magnetic elements in the process.

These coated magnetic particles eliminate the problem that is seen in the art, wherein a white powder coating is coated using magnetic particles resulting in a blackened or otherwise discolored coating. Particularly advantageous is the capability of separating the coated substrates from the magnetic elements, during this continuous process.

Further, the affixing means also serves to fluidize the coating material and the substrate when also particulate. In the present invention, a fluidized bed of particles is formed. The fluidized bed may contain only the coating material where the coating material, which is magnetic in character and the substrate to be coated is linear. When the coating material is magnetic in character and the substrate to be coated is particulate, the coating material serves to provide the fluidized bed in the magnetic field. Alternatively, when the substrate is particulate and is magnetic in character, the substrate can serve to fluidize both the substrate and the coating material. When neither the coating material nor the substrate is magnetic in character, magnetic elements are provided to fluidize the bed.

The process of the present invention is useful in providing coatings which change the properties of the surface of the substrate such as by increasing surface roughness of substrate particles to improve flowability, modify surfaces to improve corrosion resistance, and to provide particles having the characteristics of a high cost material but reduce cost by providing the material only on the outside of a particle. A particular advantage of the continuous process of the present invention is the uniformity of coating that is obtained as opposed to coatings that are presently available in the current state of the art. The continuous process of the present invention, while maintaining a consistent quality throughout is more efficient for large scale coatings, as opposed to a small batch process.

Further, the process of the present invention is environmentally friendly as no solvents are used in the coating process. Also the process does not require the need for vacuum when metallic coatings are applied to polymeric substrates using chemical vapor deposition or sputtering techniques.

Another advantage of the process of the present invention is the ability to coat fragile substrates, such as glass beads, flakes and other substrates that would be vulnerable to damage in similar processes presently available in the state of the art. Because the present invention has solved the problem of how to continuously coat articles, linear substrates, such a webs and the like can now be easily coated, a process that in the present state of the art is time consuming, inefficient and has a low yield.

DESCRIPTION OF THE PREFERRED EMBODIMENT(S)

Figure 1:
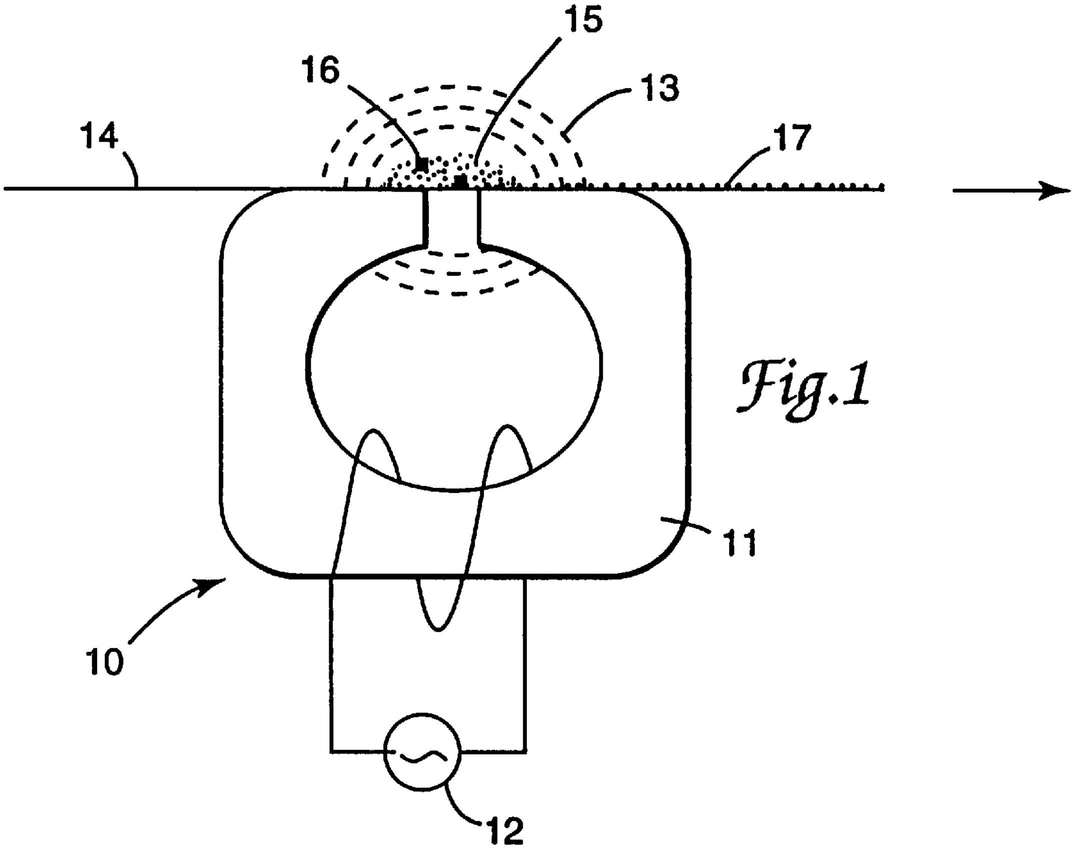
FIG. 1 is a side view of a coating system of the present invention.

Substrates useful in the present invention can vary widely. Substrates can be fine particulates to continuous linear materials such as films, tows, wire, ropes and twine, flexible tubing and fabrics. The configuration, i.e., upper limit as to shape and size of the substrate is determined by the size of the oscillating magnetic field that is generated and the size of the reaction vessel where one is used.

Particulate substrates can be as small as 0.1 μm in diameter, while continuous linear substrates can be a thin or fine as can be handled by the delivery and collection systems used.

The substrates can be hard metallic materials such as wire screen and metal tubing, relatively soft materials such as polymeric films and beads, corn starch, epoxy powder and fabrics, hard fracturable materials such as solid glass beads and roofing granules, abrasive particles such as heat treated or fused aluminum oxide, silicon carbide, alumina, zirconia, silica, boron carbide, garnet, and combinations thereof, and fragile materials such as hollow glass spheres, aluminum and mica flakes, foams, and the like. Surprisingly, the process of the present invention can be adapted to coat the fragile substrates with virtually no breakage. Also the damage to the reaction vessel can be minimized when the substrate is an abrasive material.

The surface character of the substrates can also vary from relatively smooth such as in hollow glass spheres and metal tubing to relatively complex as in screen and fabric.

Various coating materials can be applied to the substrates to serve a variety of purposes. For example, substrate surfaces can be modified to change the character of the surface from rough to smooth in order to improve the flowability properties of particulate material such as abrasive particles or to improve handling of a film during later processing. Coating materials can be applied to substrates as protective barriers such as in the application of epoxy compounds onto steel to prevent corrosion. Coating materials such as aluminum oxide particles and phenolic powder can be applied to nonwoven thermoplastic scouring material to increase the abrasiveness. Magnetic coatings such as iron oxide can be applied to polymeric substrates such as polyester films to provide magnetic recording media.

High cost coating materials can also be applied to low cost substrates to achieve desired properties with cost benefits. For example, pigments and reflective materials can be coated onto hollow glass spheres to provide desired optical qualities. Fragile reactive coatings such as chelating agents, e.g., algae, can be applied to substrates to achieve desired reactive materials. Precious metals such as gold, silver or platinum can be applied to substrates to achieve desired aesthetic effects.

The process of the present invention can also reduce manufacturing costs and provide environmental benefits. The process of the present invention uses no solvents and is of benefit where solvent coating processes have typically been used as in applying coatings to thermoplastic polymeric materials. Cobalt-doped magnetic iron oxide and resin can be coated onto polymeric sheets to provide magnetic recording media. Metallic coatings can be applied to various substrates including polymeric substrates without the use of vacuum in the present invention unlike other techniques now used.

The process of the present invention permits the use of particles much smaller than those typically used in fluidized bed processes. Generally, particles smaller than about 100 μm have been difficult to successfully fluidize resulting in bubbling and other nonuniformities in the fluidized bed. In the present invention, a fluidized bed can be formed from coating material particles as small as 0.005 μm although coating material as large as 500 μm can be fluidized as well. Thus, a range of coating material particles of from about 0.005 μm to 500 μm can be used in the present invention. Typically, particles in the range of about 0.5 to 100 μm are commonly used. Similar size ranges of substrate particles are also useful in the present invention, although such particles are usually at least 0.1 μm in diameter.

Coating materials, generally in particulate form, can be of any of a wide variety of shapes such as, for example, spherical, flake, and irregular shapes. The powder may be in the form of loose agglomerates since such agglomerates are easily broken up by collisions in the magnetic field. However, the friability of the substrate (powder) may vary over a broad range and is limited only that the substrate (powder) should be durable enough to permit fluidization of the individual particles under in the presence of numerous collisions from magnetic elements, without breakage of the primary substrate particles.

The amount of coating material used depends on the desired properties sought by addition of the coating material and coating thickness. The weight ratio of substrate to coating can range from about 500:1 to 1:20. For example, when coatings such as silica or titania are coated on silicon carbide abrasive particles to improve flowability, the weight ratio of substrate to coating material is generally in the range of 100:1 to 100:2. When aluminum or mica flakes are coated with charge bearing toner powder, the weight ratio of substrate to toner is preferably in the range of about 20:1 to 1:20, more preferably about 5:1 to 1:5, and most preferably about 3:1 to 1:3. Those skilled in the art can readily determine the appropriate weight ratios of substrate to coating material depending on the end use of the coated particles.

The coating material is applied onto the substrate by the action of the coating material or substrate material if magnetic in character or by the action of magnetic elements in a bipolar oscillating magnetic field which fluidizes the coating material, the substrate where particulate and the magnetic elements, if present, and causes peening of the coating materials onto the substrate. When the neither the coating material nor the particulate substrate is magnetic, the bipolar oscillating magnetic field causes impingement of the magnetic elements into the coating particles which forces them onto the substrate with a peening action. During such a continuous process a certain amount of the coating material coats the magnetic elements and the reaction chamber until a state of equilibrium is reached. Once a state of equilibrium is reached, this is maintained while the continuous coating process progresses. This is an improvement over the time consuming batch process that may or may not have time to reach a state of equilibrium and hence not give consistently uniform coatings.

The magnetic field may be supplied with power by means of oscillators, oscillator/amplifier combinations, solid-state pulsating devices and motor generators. The magnetic field may also be provided by means of air core or laminated metal cores, stator devices or the like. The preferred magnetic field generator is provided by one or more motor stators, i.e., motors having the armatures removed, which are powered by an alternating current supply through transformers. In addition, metal strips may be placed outside the magnetic field generators to confine the magnetic fields to a specific volume of space.

A useful magnetic field is one with an intensity sufficient to cause desirable movement, but not enough to demagnetize the magnetic character of coating materials or magnetic elements that are moved by the oscillating magnetic fields. Preferably the magnetic fields have between about 100 oersteds and 3000 oersteds magnetic intensity, more preferably between about 200 and 2500 oersteds magnetic intensity The frequency of oscillations in the oscillating magnetic field affects the number of collisions that take place between an element that is moved in the magnetic field and surrounding particles that are fluidized, i.e., always kept in motion, by collisions with the moving magnetic elements or the coating material when it is magnetic in character. If the oscillation frequency is too high, the magnetic elements or the coating material when it is magnetic in character are unable to spin in the changing field due to the inertia of the elements. If the oscillation frequency is too low, residence time is increased until there is not enough movement in the magnetic elements or the coating material when it is magnetic in character to fluidize the particles. The oscillation in the magnetic field can be caused, for example, by using multiphase stators to create a rotating magnetic field, as disclosed in U.S. Pat. No. 3,848,363 (Loveness) which is incorporated herein by reference, or by using a single phase magnetic field generator with an AC power supply at a specified cycles per second to create a bipolar oscillating magnetic field. The frequency may be from 5 hertz to 1,000,000 hertz, preferably from 50 hertz to 1000 hertz, and more preferably at the hertz which is commonly used in AC power supplies, i.e., 50 hertz, 60 hertz, and 400 hertz. The bipolar magnetic field is preferred as the magnetic field generators used are generally less expensive and more available than those used to make rotating magnetic fields.

Where the coating material has magnetic character such as with a magnetic powder, the powder generally has a coercivity ranging from about 200 to 5000 oersteds and is of the type used in the recording and computer industries for audio, video, and data recording. The magnetic powder in the magnetic field should develop sufficient motion so as to fluidize itself as well as the substrate when the substrate is particulate. Such magnetic powders include, for example, gamma iron oxide ($Fe_2O_3$), an acicular particle about 4 μm long and 1 μm in diameter with a coercivity of about 300 oersteds, available from ISK Magnetics, Inc. cobalt doped gamma iron oxide (Co—$Fe_2O_3$), an acicular particle about 4 μm long and 1 μm in diameter with a coercivity of about 800 oersteds, available from ISK Magnetics, Inc., hard barium ferrite (BaO•6 $Fe_2O_3$), a platelet particle about 0.01 μm thick and 0.1 μm in diameter with a coercivity of about 3000 oersteds, available from Toda Kogyo Corp., Japan, and other magnetic powders such as AlNiCo, rare earth metals and ceramics.

Magnetic powders are generally desired to be as small as possible to permit thin coatings to occur and the shapes are determined by the manufacturing process used to make them. It is generally preferable to use as large a quantity of magnetic powder as will fluidize to achieve the shortest time for a desired coating thickness. In general, magnetic powder can have a particle size from 0.05 μm to 5.0 μm, preferably from 0.1 μm to 1.0 μm, and more preferably from 0.1 μm to 0.4 μm.

An aggregate of magnetic elements, each of which are individual minute permanent magnets can be used to fluidize the coating material and the substrate when particulate. Such magnetic elements generally have coercivities also ranging from 200 to 3000 oersteds. Suitable magnetic elements include, for example, gamma iron oxide, hard barium ferrite, particulate aluminum-nickel-cobalt alloys, or mixtures thereof. Magnetic elements can also comprise magnetic powder embedded in a polymeric matrix, such as barium ferrite embedded in sulfur cured nitrile rubber such as ground pieces of PLASTIFORM™ Bonded Magnets, available from Arnold Engineering Co., Norfolk, Nebr. In addition, the magnetic elements can be coated with polymeric materials, such as, for example, cured epoxy or polytetrafluoroethylene, to smooth the surface of the magnetic elements or make them more wear resistant. This particular advantage is evident when coating with a white powder coating material, because the resultant coating remains white and is not discolored and/or blackened in the process.

Magnetic elements can range in size from less than the size of the powder being applied to over 1000 times the size of the particulate substrate being coated. If the magnet elements are too small, they can be difficult to separate from a powder affixed particulate substrate. Generally, the magnetic elements range in size from 0.005 μm to 1 cm. Strips of polymer embedded magnetic materials, with a length many times the size of a particulate substrate, are also sometimes useful for fluidizing sticky particulate polymeric substrates. In general, magnetic strips have a particle size of from about 0.05 mm to 500 mm, more preferably from about 0.2 mm to 100 mm, and most preferably from 1.0 mm to 25 mm. The appropriate size of the magnetic elements can be readily determined by those skilled in the art.

The quantity of magnetic elements that can be used in a magnetic field depends on residence time, type of coating, and ability of the moving magnetic elements to fluidize the powder, and particulate substrate if used. Preferably, only that quantity of magnetic elements needed to fluidize the powder in coating zone, or the powder and the substrate if a particulate substrate is used. In general, the weight of the magnetic elements should be approximately equal to the weight of the powder in the magnetic field at a given time, or the weight of both the powder and the substrate, if a particulate substrate is used.

If the magnetic elements are too large, they may damage fragile or fracturable particulate substrates. For example, when hollow glass bubbles having an outer diameter of 20 μm and a wall thickness of 1 μm are to be coated in the presence of magnetic elements where the magnetic material is in a polymeric base such as those prepared by grinding PLASTIFORM™ magnetic material to form magnetic elements of various sizes, those elements which pass through a No. 30 mesh screen but not through a No. 45 mesh screen will generally fracture a portion of the hollow glass bubbles if the magnetic field intensity is sufficient to fluidize the bubbles. However, magnetic elements which pass through a No. 80 mesh screen but not through a No. 120 mesh screen will not cause fracturing of the glass bubbles.

Chambers useful in the present invention can be of a variety of non-metallic materials such as flint glass; tempered glass, e.g., PYREX™ glass; synthetic organic plastic materials such as polytetrafluoroethylene, polyethylene, polypropylene, polycarbonate and nylon; and ceramic materials. Metallic materials can be used although eddy currents can occur, which would negatively affect the oscillating magnetic field and increased power would be required to overcome these effects.

The thickness of the chamber wall should be sufficient to withstand the collisions of the magnetic elements and depends on the materials used. Appropriate thickness can readily be determined by those skilled in the art. When polycarbonate is used to form the chamber, a suitable wall thickness can be from 0.1 mm to 25 mm, preferably from 1 mm to 5 mm, more preferably from 1 mm to 3 mm.

The shape of the chamber can be cylindrical, spherical, polyhedral or irregular since the magnetic field will fill any shape and fluidize the powder within the chamber. The chamber can be of any orientation, such as, for example, vertical, horizontal, angular, or corkscrew.

The process of the invention will now be further explained with regard to the various coating apparatus shown in the drawings.

FIG. 1 shows coating device for applying coating materials to linear continuous substrates such as films, fibers, nonwoven materials, screening, wire, or tubing. The device 10 includes C-frame motor stator 11 which is driven by alternating current power supply 12 which provides a magnetic field represented by magnetic field lines 13. Moving substrate 14 which is placed in close proximity to stator 11 such that substrate 14 is within the magnetic field. For reasons of simplicity of operation, the substrate can run indirect contact with the stator or, if desired, can be held as much as 10 mm distant from the stator by means of spacers or delivery control means. When the coating material is not of magnetic character, coating material 15 and magnetic elements 16 are also introduced in to magnetic field and coating material 15 is affixed to substrate 14 by the peening action of magnetic elements 16 which move with a great deal of action in the magnetic field and drive coating material 15 onto substrate 14 to form coated substrate 17.

When the coating material is of magnetic character, the magnetic elements are not necessary as the coating material itself moves about in the magnetic field and strikes the substrate. The magnetic coating material is preferably metered into the oscillating magnetic field by a powder conveying device, such as, for example, a Model H20/DDS/20/20 Loss-In-Weight Screw Feeder, available from Brabender, Duisberg, Germany, and a vibratory feeder, available from FMC Corp., Homer City, Pa.

Figure 2:
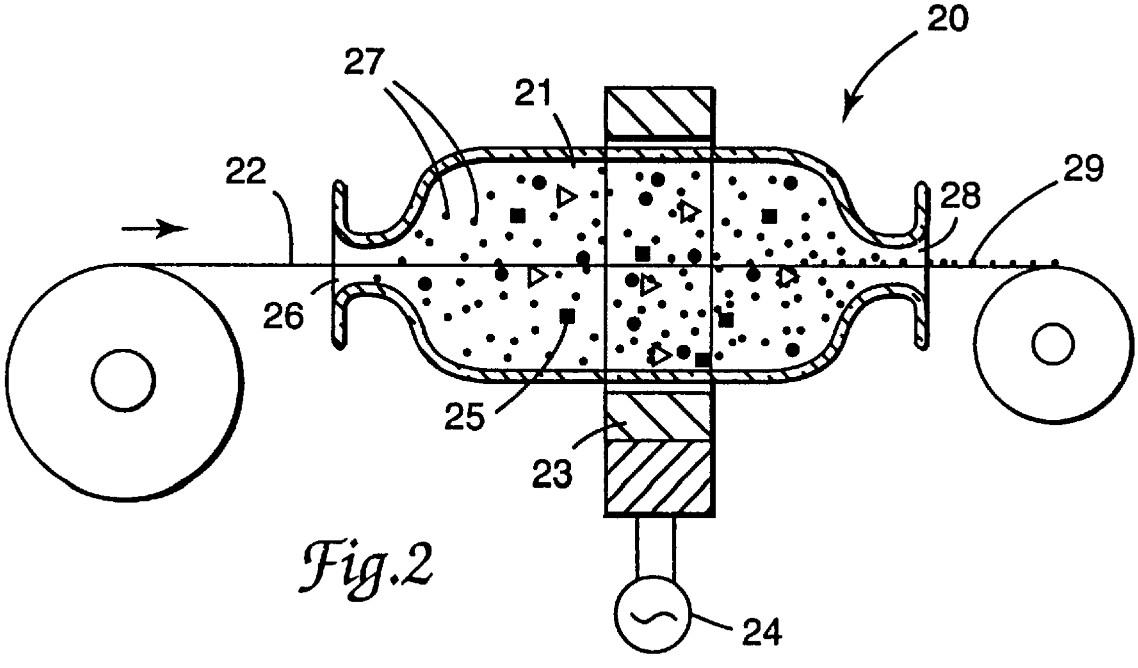
FIG. 2 is a cross-sectional view of another coating system of the present invention.

FIG. 2 shows an alternate embodiment of a device useful in the present invention for coating linear continuous substrates. This coating device 20 includes a coating chamber 21 through which substrate 22 can pass. Coating chamber 21 may be positioned horizontally, vertically or at any position between horizontal and vertical. A C-frame motor stator 23 driven by alternating current power supply 24 provides a magnetic field around coating chamber 21. Magnetic elements 25 are introduced into coating chamber 21 and into the presence of the oscillating magnetic field. Substrate 22 moves from a supply roll through inlet port 26 into coating chamber 21 together with coating material 27 and then after being coated the substrate exits through outlet port 28 onto a take-up roll as coated substrate 29. The configuration of inlet port 27 coating chamber 21 and outlet port 28 depend on the type of substrate being coated. For substrates which are relatively circular in form such as tow, tubing, wire, and the like, the ports are preferably circular and the chamber can be cylindrical or approaching spherical. For substrates which are relatively flat such as films, fabrics, screening and the like, inlet and outlet port can be in the form of slots and the coating chamber can be of a somewhat flatter configuration. The sizes of the ports are preferably such that the magnetic elements, when present, are substantially retained within the chamber.

Coating material 29 which is nonmagnetic in character is introduced into coating chamber 25 as substrate 22 passes through chamber 25 in the magnetic field and the impinging action of the moving magnetic elements 26 peens coating material 29 onto substrate 22. As with the device of FIG. 1, magnetic elements would not be needed when the coating particles are magnetic in nature.

Figure 3:
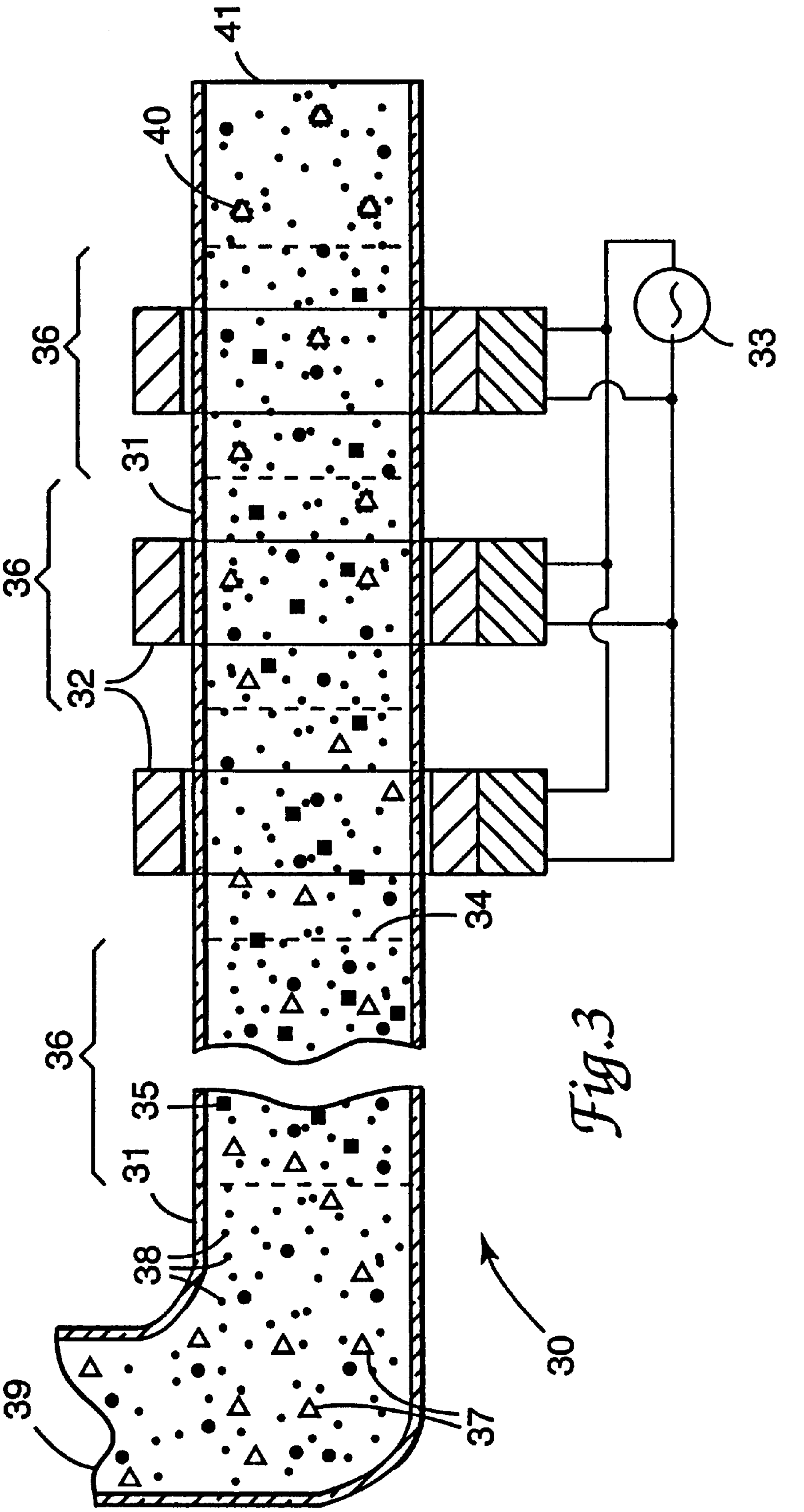
FIG. 3 is a cross-sectional view of another coating system of the present invention.

FIG. 3 shows a device for continuously applying coating materials onto particulate substrates. The device 30 includes tubular reaction chamber 31 around which is placed at least one device for generating a magnetic field such as stators 32 driven by alternating current power supply 33. The reaction chamber 31 can be oriented in a horizontal position, a vertical position or any position between horizontal and vertical. Screens 34 are placed along the length of the reaction chamber 31 with magnetic elements 35 located within each screened section 36. The screens can be made of various materials including polymeric materials, ceramic materials and metal. Preferably the screens are made from stainless steel or nylon. Although eddy currents may form if the screens are made from metal, they do not seem to be strong enough to have a significant effect on the applied oscillating field. Particulate substrate material 37 and coating material 38 are introduced at inlet port 39. When the magnetic field is applied, magnetic elements 35 move and fluidize the particulate substrate material 37 and coating material 38. The magnetic elements impinge upon coating material 38, peening coating material 38 onto substrate 37. The coated particles 40 then leave the reactor at discharge port 41.

By proper selection of the mesh size of the screens 34, the particulate substrate material 37, coating material 38 and the size of magnetic elements 35, the system can be designed such that magnetic elements 35 are retained within each screen section 36, while substrate material 37, coating material 38 and coated particles 40 move easily through the chamber. Reaction chamber vibrating means, not shown, further aid in moving the materials through the chamber, often resulting in a five- to tenfold increase in throughput. In addition, a mixture of a few large magnet elements among a group of smaller magnetic elements help to prevent screens from plugging if hygroscopic powders are used as the coating material or substrate. Further, it is possible to add a mechanical vibrator to facilitate movement of the particles through the reaction chamber.

Alternatively, such a system can be operated without the screens by feeding the particulate substrate material, the coating material and the magnetic elements into the input port allowing the magnetic elements to impinge on the coating material and peen the coating material onto the substrate material to form coated substrate and separate the magnetic elements from the coated substrate at the discharge port using magnetic separators. The system could be similarly operated without the use of the magnetic elements when the substrate particles or the coating material has sufficient magnetic character to cause the particle to fluidize in the presence of a magnetic field. When only the substrate material and coating material having magnetic character are supplied to the chamber, they are preferably premixed.

Further alternative embodiments of similar systems which do not utilize screens within the chamber include nontubular chambers such as screw conveyers, Archimedes screws, or zigzag mixers are also useful in practicing the present invention.

Figure 4:
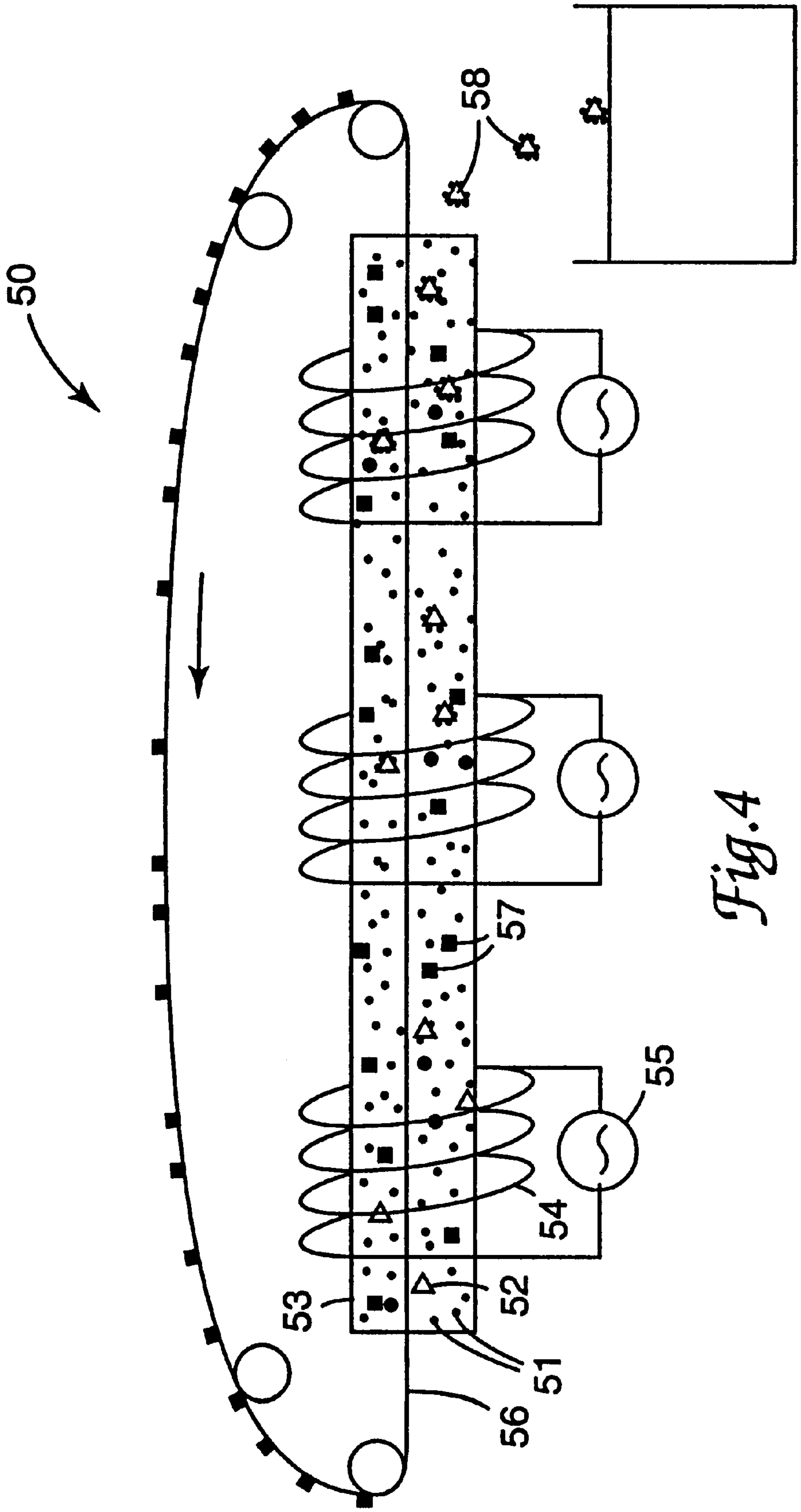
FIG. 4 is a side view of another coating system of the present invention.

FIG. 4 shows a device 50 for continuously applying coating materials 51 onto particulate substrates 52 using a reaction chamber 53 which is immersed in the magnetic field generated by electromagnetic field generators 54 such as a coil or coils of conducting wire driven by an alternating current power supplies 55. A continuous flexible magnetic belt 56 passes through reaction chamber 53 at a controlled speed through a region of oscillating magnetic fields and out of the chamber to a region of ambient magnetic fields. Substrate material 52, coating material 51 and magnetic elements 57 are initially continuously fed into the reaction chamber 53. As the substrate material 52, the coating material 51 and the magnetic elements 57 enter the region of oscillating magnetic fields, they become fluidized and the magnetic elements 57 impinge upon coating material 51 and peen coating material 51 onto particulate substrates 52. As the magnetic elements 57 and the coated substrates 58 exit the reaction chamber, the coated particles 58 are collected and the magnetic elements adhere to the flexible magnetic belt and are returned to the input port where particulate substrate and coating material are added for conveyance through the reaction chamber and application of the coating material onto the substrates. This type of coating system is particularly useful for coating polymeric substrates which have coherent surfaces.

The above descriptions can be varied depending on the desired results. More than one of the same device can be used in series to increase the amount of powder that is affixed to a substrate during a given pass. Also, more powder can be applied to a substrate if the powder affixed substrate is passed through the process more than one time. In addition, more than one kind of powder can be affixed, as distinct layers, if the substrate is passed through the process more than one time and the powder is changed between passes. Other variations are also apparent to one skilled in the art.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated. In the examples unless otherwise noted, the magnetic elements were prepared by grinding PLASTIFORM™ B-1030 magnetic material, available from The Arnold Engineering Co., Norfold, Nebr., and screening the ground material to obtain the desired size. Flowability of certain coated materials prepared according to the invention were tested as follows:

Ajar or vial is half filled with a sample of particulate material, held at an angle between 45° and 90° from horizontal, and slowly rotated. If the particulate material is observed to move as clumps, the material is the to have poor flow properties. If the particulate material is observed to move easily, like a liquid, it is said to have good flow properties.

EXAMPLES 1–4

In Example 1, Type IM7 carbon tow having a hard surface, available from Hercules, Inc., with each carbon fiber having a generally circular cross-section about 5 μm in diameter, was passed at 1 m/min through a series of 4 PYREX™ substantially spherical glass chambers, each having an inside diameter of about 25 mm and openings 1 mm in diameter at opposing sides of the chambers for passage of the tow. Each chamber was provided with a single magnetic field generator that surrounded a portion of the chamber length. The field generators were C-frame motor stators obtained by removing the armature from a C-frame electric motor. They were powered by a variable transformer having 8 amp, 120 volt, 60 hertz capacity.

SCOTCHKOTE™ 134 epoxy powder, average particle diameter about 5 μm and which contained thermal initiator, available from 3M Company, was fed at a rate of 100 mg/min., by a vibratory feeder, Model 25A, available from Eriez Magnetics, Inc., into each chamber through a separate opening. Approximately 5 g of magnetic elements were confined in each of the chambers. The magnetic elements were selected such that they passed through a No. 30 mesh screen but not a No. 50 mesh screen to provide magnetic elements having a short dimension of about 2 mm and long dimension of about 3 mm.

The voltage from a variable alternating current transformer, plugged into an 8 amp, 110 volt, 60 hertz direct current outlet and attached to each stator, was raised from 0 to about 20 volts so that the resulting 60 hertz oscillating magnetic field caused the magnetic elements to move enough to fluidize the powder and cause the powder to become affixed to the carbon tow. The epoxy coated carbon tow was then heated to 100° C. for 2 minutes in an air circulating oven. That the epoxy powder melt flowed into a continuous coating on the fibers of the carbon tow was confirmed by scanning electron microscopy (SEM).

In Examples 2–4, substrates were coated as in Example 1, except glass tow having a hard surface, S-2 glass fiber yarn available from Owens Corning Co., with an approximately circular cross-section of about a 5 μm diameter, was coated in Example 2; 16-ply No. 1 cotton twine, available from Turnquist Paper, Brooklyn Park, Minn., with an approximately circular cross-section of about a 1 mm diameter, was coated in Example 3; and enamel coated copper wire, a ductile material, available from Alpha CO., with an approximately circular cross-section of about a 0.5 mm diameter, was coated in Example 4.

In each of Examples 2–4, continuous coatings were formed on the various substrates as was confirmed by SEM. The epoxy coating provided the substrates with an additional electrically insulating layer.

EXAMPLE 5

In Example 5, a magnetic field generator, constructed as shown in FIG. 1, was positioned under a 6 cm wide and 150 μm thick web of polyethylene terephthalate film moving at 1 m/min. The source generated a gradient bipolar magnetic field, oscillating at 60 Hz, that extended through and above the film. Magnetic iron oxide powder, an acicular cobalt modified gamma iron oxide with an average length of about 0.4 μm and an average diameter of about 0.1 μm with a coercivity of 800 oersteds, available from Toda Kogyo Corp., and having sufficient magnetic properties to be fluidized by the oscillating bipolar magnetic field, was fed at 1 mg/min into the oscillating bipolar magnetic field above the moving film. The gradient of the oscillating magnetic field was such that the field confined the magnetic particles in the desired coating region until they impacted the surface of the film with such force as to adhere to the film surface. Adhesion of the magnetic iron oxide particles to the film surface was determined by visual observation.

EXAMPLE 6

In Example 6, a web of bonded nonwoven substrate was coated. The substrate was formed from a web of 13.5 denier, 3.8 cm long high-tenacity nylon 6,6 staple fiber (Type P-85, available from E.I. du Pont de Nemours & Co., Inc.). A binder solution comprising 1.5 parts isopropanol, 3.66 parts phenolic resin, 0.89 parts red dye, 1.31 parts flexiblizer and 0.009 parts silicone antifoam was roller coated onto the web, dried and cured at about 175° C. for about 10 minutes. A sample of the web 20 mm wide and 3 mm thick, moving at 1 m/min, and a powder mixture of 4 parts SUN CHLORELLA™ algae powder, 50 μm average particle size, available from Sun Wellness, Inc., Torrance, Calif., and 1 part SCOTCHKOTE™ 134 epoxy resin powder as used in Example 1, was fed at a rate of 100 mg/min into the top of a PYREX™ glass chamber. The glass chamber, 24 inches in length and having an inside diameter of 2.5 cm, was positioned at a slant about 25° from horizontal. The glass tube was provided with 14 separate magnetic field generators which were stators obtained by removing the armatures from C-frame electric motors. The stators were attached by a variable transformer to an 8 amp, 110 volt, 60 hertz alternating current power supply and evenly spaced along the tube length. A vibrator, available from Eriez Magnetics, Erie, Pa., was attached to the tube to move the material through the tube. Approximately 125 g of magnetic elements which passed through a 25 mm (1 in) mesh screen but not a 6.3 mm (¼ in) mesh screen, were fed into the tube with the web and the powder mixture. The 60 hertz oscillating bipolar magnetic field was increased in intensity, by increasing the voltage, such that the magnetic elements moved sufficiently to fluidize both the fragile algae powder and the epoxy powder and force both of the powders to adhere to the surface of the web. The algae and epoxy coated web was suitable for use in removing various metal ions from water.

EXAMPLES 7 AND 8

In Example 7, a nonwoven substrate was coated as in Example 6 except instead of a mixture of algae and epoxy powders, SCOTCHKOTE™ 134 epoxy resin powder as used in Example 1 was fed into the tube at 5 mg/min with the magnets, the epoxy coated substrate was subsequently heated to 100° C. for 30 seconds in an air circulating oven to cause the epoxy to melt flow to form a continuous coating, the epoxy coated substrate was passed through the chamber again at a rate of 1 m/min with copper flake, a fragile material having an average size of 25 μm, available from Aldrich Chemical Co., at a rate of 10 mg/min, and the epoxy coated nonwoven web with copper flakes affixed to the epoxy surface was heated at 110° C. for 2 hours. On observation, the epoxy was found to be a continuous coating and the copper particles were found to cover about 50 percent of the epoxy surface giving the nonwoven a durable coppery surface useful as an antimicrobial nonwoven web.

In Example 8, a nonwoven substrate was coated as in Example 6 except instead of a mixture of algae and epoxy powders, 240 mesh aluminum oxide abrasive particles, with an average particle size of 53 μm, and 30485 DUREZ™ Phenolic Resin, a novolac phenolic resin available from Occidental Chemical Co., were mixed at a ratio of 3:1 aluminum oxide:resin and fed into the chamber at 1 g/min. The abrasive particles were sufficiently bonded to the nonwoven substrate that the material was useful as an abrasive cleaning pad.

EXAMPLES 9–11

In Examples 9–11, samples were prepared using the same type of chamber, magnetic field generators, vibration means, stators and power supply as in Example 6 except 15 galvanized steel screens, perpendicularly attached to a 3.1 mm (⅛ in) diameter wood rod through their centers, were placed in the tube such that a stator encircled the tube cross-section before each screen. The mesh size of each screen was the same as the largest mesh size that the magnetic elements would not pass through.

In Example 9, 5 g of magnetic elements which were sized such that they passed through a 25 mm mesh screen but not through a 6.3 mm mesh screen were placed on top of each screen within the chamber. Epoxy powder of the same type as used in Example 1 was introduced into the chamber at a rate of 10 mg/min. The magnetic field intensity was increased to cause the magnetic elements to fluidize the epoxy powder and cause the powder to impact the surface of the chamber and form a coating thereon. The screens were removed from the coated chamber and the chamber was heated at 100° C. for 60 minutes to effect the formation of a continuous cured epoxy coating. The coating was well adhered and provided an opaque insulating layer.

In Example 10, a coating was adhered to the interior surface of a glass chamber as in Example 9, except instead of epoxy powder, magnetic iron powder, 0.1 μm in diameter was used. The magnetic character of the iron powder was sufficient to enable the powder to be fluidized in the magnetic field and satisfactorily impact onto the surface of the chamber and adhere without the use of magnetic elements. The iron coating on the interior of the chamber provided the chamber with an opaque coating.

In Example 11, a coating was adhered to the interior surface of a glass chamber as in Example 9, except instead of epoxy powder a blue toner powder, with a particle size range of 1–10 μm, as measured by a Coulter TA-11 particle analyzer, from Coulter Corp., Miami, Fla., was used. The blue toner powder was prepared by twin screw extruder melt mixing, at 190–210° C., 86 parts ACRYLOID™ B66, a methyl/butyl methacrylate copolymer available from Rohm and Haas Co., 6 parts of a predispersion of 50 parts IRGAZIN™ GLG Pigment Blue 15:3, a copper phthalocyanine pigment available from Ciba-Geigy Corp. and 50 parts ACRYLOID™ B66, and 8 parts TRIBLOX™ PC-100, a quaternary ammonium functional acrylic polymer from DuPont Co.; converting the mixture into particles by cooling the mixture into a cake, breaking the cake, and milling the fragments into finer particles; and separating the resulting particulate material to provide particles having a size range of 1–10 μm. On top of each screen in the chamber was placed 5 g of magnetic elements having a size such that they passed through a 25 mm mesh screen but not through a 6.3 mm mesh screen. The adhesion of the respective powders to the PYREX™ glass surface was found to be satisfactory and provided the glass cylinder with a blue coating.

EXAMPLES 12–17

In Examples 12–17, samples were prepared using the same type of chamber, magnetic field generators, vibration means, stators and power supply as in Example 9. In each example, the substrates were fragile SCOTCHLITE™ K20 hollow glass spheres having an average outer diameter of 60 μm and an average wall thickness of 0.8 μm, available from 3M Company, which were continuously fed at 10 mg/min.

In Example 12, the screens placed in the chamber between each magnetic field generator had a No. 100 mesh size to permit passage of the glass spheres through the chamber. On top of each screen was placed 5 g of magnetic elements which passed through a No. 80 mesh screen but not through a No. 100 mesh screen. Copper flake, a relatively fragile particle, having an average size of 25 μm was fed into the chamber at a rate of 10 mg/min and a magnetic field was applied to cause the magnetic elements to peen the copper flake onto the outer surface of the hollow glass spheres. The process did not result in any noticeable hollow glass sphere breakage or destruction of the copper flakes and the hollow glass spheres exited the process with a coppery appearance. The copper coating which was well adhered to the hollow glass spheres provide a copper metallic coating for coloration or electronic conductivity.

In Example 13, hollow glass spheres were coated in the same manner as in Example 12 except aluminum flake, also a fragile particulate material, having an average size of 25 μm was substituted for the copper flake and fed at a rate of 10 mg/min. The process did not result in any noticeable hollow glass sphere breakage or disintegration of the aluminum flakes. The aluminum coating which was well adhered to the hollow glass spheres provided an aluminum metallic coating for coloration or electronic conductivity.

In Example 14, hollow glass spheres were coated in the same manner as in Example 12 except the coating material was the blue toner particulate used in Example 11 which was fed at a rate of 10 mg/min. The process resulted in well coated glass spheres which were blue.

In Example 15, hollow glass spheres were coated as in Example 12, except the coating material was silver dioxide, an antimicrobial agent having an average diameter of 0.5 μm, available from Johnson Matthey ALFA™, AESAR™ Catalog Co., Ward Hall, Mass. which was fed at a rate of 5 mg/min. The silver dioxide provided a uniform adherent coating which made the glass spheres suitable for utilization as an antimicrobial additive.

In Example 16, hollow glass spheres were coated as in Example 12, except the coating material was compressed acetylene carbon black pigment, average diameter 42 nm (0.042 μm), available from Chevron Chemical Co., Cedar Bayou, Tex., which was fed at a rate of 5 mg/min. The carbon black provided an adherent, uniform coating which made the glass spheres suitable for use as coloration additive.

In Example 17, hollow glass spheres were coated as in Example 12 except the coating material was the same epoxy powder which contained a thermal initiator as was used in Example 1. After coating, the spheres were heated at 100° C. for 5 minutes to effect formation of a continuous coating on each sphere. The epoxy coating was observed to be continuous and the epoxy coated spheres were suitable for molding. The spheres could be formed into a shape and reheated to melt the epoxy to produce objects such as flower pots.

EXAMPLES 18–20 AND COMPARATIVE EXAMPLE 1

In Examples 18–20 and Comparative Example 1, hollow glass spheres were coated. The coating chamber was a vertically positioned LUCITE™ tube. The chamber was 23 cm (8 in) long and had an inside diameter of 13 cm (6 in) and a wall thickness of 3.1 mm (⅛ in). The chamber had a single magnetic field generator which was a cylindrical solenoid made by Mag-Con, St. Paul, Minn. The solenoid surrounded a portion of the tube length that was cross-sectionally divided by 15 nylon screens, with a mesh size of No. 100, spaced about 6 mm apart such that the hollow glass spheres could pass through. The cylindrical solenoid was attached to a 200 amp, 560 volt, 60 hertz alternating variable current power supply. Approximately 150 g of magnetic elements were evenly divided into 15 groups and placed on top of the screens. To operate, the magnetic field intensity was increased by increasing the voltage such that the magnetic elements moved sufficiently to fluidize the pigment and adhere the pigment to the surface of the hollow glass spheres as they passed through the magnetic field in the cylindrical tube.

In Example 18, the hollow glass spheres, as described in Example 12, and Rocket Red quinacrydone pigment, having an average particle size under 1 μm, available as from Sun Chemical Co., were premixed in a 20:1 ratio of spheres to pigment and the mixture was fed with a Eriez Magnetics vibrating feeder at a rate of 500 mg/min into the top of the coating chamber. The size of the magnetic elements was such that they passed through a No. 80 mesh screen but not through a No. 100 mesh screen. Fluidization was initiated and the magnetic elements caused the pigment to coat the glass spheres. The coated glass spheres discharged from the bottom of the chamber. The process did not result in any noticeable hollow glass sphere breakage and the hollow glass spheres exited the process with a red color, being useful as a pigment in paint.

In Example 19, SCOTCHLITE™ K37 glass bubbles, having an average outer diameter of 50 μm and an average wall thickness of 1.3 μm, available from 3M Company, and pigment grade titania having an average diameter of less than 1 μm were premixed in a ratio of 100:30 spheres to pigment and the mixture was fed at a rate of 500 mg/min into the top of the coating chamber, the magnetic elements were the same size as in Example 18 and fluidization was initiated. The process did not result in any noticeable hollow glass sphere breakage and the hollow glass spheres exited the process with a white color, being useful for oil spill remediation.

The material of Example 20 was prepared as in Example 19, except the hollow glass spheres were as described in Example 12 and the ratio of spheres to pigment was 100:5. The coated glass spheres were also useful for oil spill remediation.

In Comparative Example 1, hollow glass spheres, as described in Example 12, were coated as in Example 20 except the ground magnetic elements passed through a No. 30 mesh screen and did not pass through a No. 45 mesh screen. Significant breakage of the hollow glass spheres occurred due to the larger size of the magnetic particles.

EXAMPLES 21–24

In Examples 21 and 22, samples were prepared using the same type of chamber, magnetic field generators, vibration means, stators and power supply as in Example 9.

In Example 21, aluminum flake was coated, the aluminum flake having been prepared by mixing 300 g of SILBERLINE™ 3122-AR aluminum paste, available from Silberline Co. with 100 g of mineral spirits to form a slurry; filtering the slurry through Whatman #42 filter paper in a Buchner funnel to form a filter cake; washing the filter cake with 300 g heptane followed by 100 g ethyl acetate to form a press cake; breaking up the press cake; and allowing the fragments to dry in an oven at 77° C. (170° F.) for two hours to form dry aluminum flakes having an average size of 36 μm. Placed on top of each screen in the chamber were 5 g of ground magnetic elements which passed through a No. 30 mesh screen and did not pass through a No. 25 mesh screen. The aluminum flake and blue toner particles as described in Example 11 were premixed at a ratio of 1:3 flake:toner and the mixture was fed at a rate of 20 mg/min with the magnetic field intensity sufficient to cause the magnetic elements to fluidize the aluminum flake and the toner particles. The resulting toner-coated aluminum flakes which exited the bottom of the chamber were showed minimal damage to the fragile aluminum flake when viewed with a scanning electron microscopy.

In Example 22, coated flakes were prepared as in Example 21 except coated mica flake, Type 9151-AR pearl flake, available from EM Industries, Inc., having an average size of 50 μm were substituted for the aluminum flake. The mica flakes were shown to have minimal damage by the coating process when viewed with a scanning electron microscope.

In Examples 23 and 24, samples were prepared using the coating system described with regard to Examples 18–20. The magnetic elements used passed through a No. 10 mesh screen but did not pass through a No. 25 mesh screen. The particles used in Example 23 were aluminum flakes described in Example 21, while the particles used in Example 24 were mica flakes, available as AFFLAIR™ 299 Flash Green pearlescent flake from EM Industries, Inc. The particulate powder coating material was clear toner prepared by single screw extruder melt mixing, at about 188° C. (370° F.), 72.0 parts ACRYLOID™ B66, a methyl/butyl methacrylate copolymer available from Rohm and Haas Co., 24.0 parts UCAR™ VAGH, a vinyl terpolymer available from Union Carbide, and 4.0 parts VP2036, a negative charge control agent available from Hoechst; converting the mixture into particles by cooling the mixture into a cake, breaking the cake, and milling the fragments into finer particles; and separating the resulting particulate material to provide particles having a size range of 1–10 μm. The flake to powder ratio was 12:88 in Example 23 and 15:85 in Example 24. In both Example 23 and 24, the flakes and the powder were premixed and the mixture was fed at a rate of 1 g/min. The resulting products had substantially no damage to the flakes used.

In each of Examples 21–24, the toner was affixed to the flakes as seen by viewing the coated flakes in a scanning electron microscope.

EXAMPLES 25 AND 26

In Examples 25 and 26, samples were prepared using the same type of chamber, magnetic field generators, vibration means, stators and power supply as in Example 9. The substrates were MACROLITE™ ceramic foam beads having an average diameter of 500 μm, available from 3M Co. and 5 g of magnetic elements which passed through a No. 25 mesh screen but not a through a No. 30 mesh screen were placed in the chamber on top each screen.

In Example 25, the beads were coated with epoxy powder having thermal initiators which was described in Example 1 with the beads being fed at a rate of 1 g/min and the epoxy powder being fed at a rate of 50 mg/min into magnetic field sufficient to fluidize the materials. The coated beads were then heated for 60 minutes at 100° C. to cause the coating to flow and become continuous. The resulting beads are useful as oil well drilling mud when mixed with water.

In Example 26, the beads were coated with algae powder which was described in Example 9 with the beads being fed at a rate of 2 g/min and the algae powder being fed at a rate of 20 mg/min into magnetic field sufficient to fluidize the materials. The resulting algae coated ceramic beads is useful for removing metal ions from water.

EXAMPLES 27–28

In Examples 27 and 28, samples were prepared using the same type of chamber, magnetic field generators, vibration means, stators and power supply as in Example 9. The magnetic elements used were PLASTIFORM™ magnetic strips about 3 mm×6 mm×25 mm and were used in an amount of 5 g placed on top of each screen. The magnetic field intensity was such that the substrates and particles were fluidized.

In Example 27, photosensitive polyurethane pellets were prepared by premixing 58.52 parts poly-1,2-(butylene oxide)diol, available as XAS Diol 10961.01 from Dow Chemical Co., 4.61 parts of 1,4-butane-diol, available from GAF Chemical Co., 2.46 parts 1-glycerol methacrylate, available from Nippon Oil & Fats Co., 1.50 part α,α-diethoxy acetophenone, available as IRGACURE™ 651 from Ciba Geigy Co., 0.03 parts 3,7-bis(dimethylamino) phenazathionium chloride, available as Methylene Blue from Eastman Kodak Co., and 0.11 part dibutyl tin dilaurate, available from Elf Atochem NA Inc., Philadelphia Pa.; metering the above polyol mixture and 32.77 parts of 4,4'-bis-(isocyanatocyclohexyl)methane, available as DESMODUR™ W from Mobay Chemical Co., at a flow rate of 150 g/min with a precision flow metering system into the inlet port of a 34 mm twin-screw counter rotating extruder, available from Leistritz Co. that is operating at about 170° C.; and segregating the photopolymerizable urethane polymer into pellets with a diameter of approximately 2 mm.

The polyurethane pellets and CAB-O-SIL™ TS720 hydrophobic silica powder having a surface area of between about 80 and 120 $m^2/g$ and particle size of about 0.02 $\mu$m, available from Cabot Corp., were premixed in a ratio of 100:1 pellets:powder and the mixture was fed at a rate of 500 mg/min. The silica coated polymer pellets had improved flowability, i.e., the untreated pellets stuck together and the treated pellets flowed as separate beads, but the soft character of the polymer surface was not harmed.

In Example 28, 3505 polypropylene pellets having an average diameter of 1.5 mm, available from Exxon, and algae particles as described in Example 6 were premixed in a ratio of 100:1 beads:algae and the mixture was fed at a rate of 500 mg/min. The algae coated polymer beads had utility as a chelating agent to remove various metal ions from water.

EXAMPLES 29–31

In Examples 29–31, the apparatus and procedure used were that described in Examples 18–20, with the magnetic elements being PLASTIFORM™ magnetic strips about 3 mm×6 mm×25 mm and were used in an amount of 15 g on each screen.

In Example 29, high temperature polyetherimide resin substrate (obtained as ULTEM™ pellets from General Electric Co., Pittsfield, Mass.; emulsified by mixing 18 parts ULTEM™, 0.9 parts of a hydrogenated resin available as FORAL™ AX from Hercules Inc., 67.8 parts methylene chloride, 0.14 parts potassium hydroxide, and 18.1 parts deionized water; precipitated in methanol; filtered; and dried) having an average particle size of 5 $\mu$m and silica powder as described above with regard to Example 27 were premixed in a ratio of substrate to powder of 100:5 and the mixture was fed at a rate of 2 g/min. The silica coated resin had a utility of preventing reagglomeration of the ULTEM™ powder and permitting a more uniform dispersion of the ULTEM™ powder in other materials.

In Example 30, 42/5 zinc stearate powder having a particle size of less than 44 $\mu$m, available from Witco Corp., and silica as described above with regard to Example 27 were premixed in a ratio of 1000:15 substrate:particle and the mixture was fed at a rate of 1 g/min. The silica coated zinc stearate was more flocculent and flowable than the uncoated zinc stearate when tested according to jar test.

In Example 31, zinc stearate powder as described in Example 30 and titania particulate as described with regard to Example 19 were premixed in a ratio of 100:2 stearate powder:titania and the mixture was fed at a rate of 1 g/min. The titania coated zinc stearate was more flocculent than the uncoated zinc stearate when tested using the jar test.

EXAMPLES 32 AND 33

In Example 32, samples were prepared using the apparatus and process of Examples 18–20. Zinc stearate powder as described in Example 30 and magnetic iron oxide particles as described in Example 5 were premixed in a ratio of 450:26 substrate:particulate and the mixture was fed at a rate of 1 g/min. A magnetic field was sufficiently intense that the magnetic character of the iron oxide was sufficient to fluidize the zinc stearate and iron oxide and to cause the iron oxide to form a coating on the zinc stearate. The iron oxide coated zinc stearate had utility as a pigmented filler in a coated abrasive construction.

In Example 33, samples were prepared using the same type of chamber, magnetic field generators, vibration means, stators and power supply as in Example 9. Potassium fluoroborate powder substrate, the micropulverized form which can pass through a No. 200 mesh screen, available from Jacobson, Inc., Roseville, Minn., and magnetic iron oxide as described with regard to Example 32 was premixed in a ratio of 100:2 substrate:iron oxide and the mixture was fed at a rate of 500 mg/min. The magnetic field was sufficiently intense that the magnetic character of the iron oxide was sufficient to fluidize the potassium fluoroborate and iron oxide and to cause the iron oxide to form a non-reactive coating on the acidic potassium fluoroborate. The iron oxide coated potassium fluoroborate significantly reduced the foaming reaction that occurred when acidic potassium fluoroborate was added to a basic liquid phenolic resin.

EXAMPLES 34 AND 35

In Example 34, hard fracturable roofing granules, prepared from granite that had been pulverized and screened to an ANSI grade of #11 were coated as in Example 9 with red iron oxide pigment having an average size of less than 1 $\mu$m. Both were premixed in a 200:1 ratio of granules to oxide. The mixture was fed at 200 g/min. The screens in the chamber passed the granules but not the magnets. The resulting iron oxide coated granules could then be utilized to make red roofing.

In Example 35, steel window screen having a mesh size No. 16 was coated with epoxy powder as described in Example 7 with the apparatus as described in Example 7. The steel window screen was fed into the chamber at a rate of 0.5 m/min and the epoxy powder was fed at a rate of 80 mg/min. The epoxy coated screen was heated at 100° C. for 60 minutes. By microscopic examination, the screen was determined to be completely covered with epoxy demonstrating an ability to coat intricately shaped surfaces.

EXAMPLES 36–38

In Example 36, calcium carbonate having a average diameter of about 15 $\mu$m, available form J.M. Huber Co., was coated using the apparatus and procedure of Examples 18–20 with the feed rate for the premixed mixture of calcium carbonate and AEROSIL™ R972 hydrophobic silica having a surface area between about 90 and 130 $m^2/g$ and a particle size under 0.2 $\mu$m, available from Degussa Corp. in a ratio of 100:1 calcium carbonate:silica, being fed at a rate of 5 mg/min.

In Example 37, cryolite having an average diameter of about 20 $\mu$m, available from Washington Mills, Inc. was coated as in Example 36 with the 100:1 mixture of cryolite to silica being fed at a rate of 5 g/min.

In Example 38, #64 zinc dust having an average diameter of about 2 $\mu$m, available from Zinc Corp., was coated as in Example 36 with the 100:2 ratio of zinc dust to silica being fed at a rate of 5 g/min.

In Examples 36–38, the silica coating provided the calcium carbonate, the cryolite and the zinc dust with improved flowability when evaluated using the jar test.

EXAMPLE 39

In Example 39, 240 mesh aluminum oxide was coated with 30485 DUREZ™ phenolic resin, a novolak phenolic resin available from Occidental Chemical Co. using the procedure of Example 9. The aluminum oxide and the resin were premixed in a weight ratio of 3:1 and the mixture was fed at a rate of 500 mg/min. The magnetic elements used passed through a No. 1 mesh screen but not through a No. 4 mesh screen, and the screens used were No. 4 mesh. The adhesion of the phenolic powder to the abrasive grit was sufficient to subsequently attach the grit to a desired substrate such as bonded nonwoven web.

EXAMPLES 40–42

In Examples 40–42, substrates were coated with powders using the apparatus and procedure described in Example 18–20.

In Example 40, silicon carbide abrasive particles were crushed such that the abrasive particles passed through a No. 120 mesh screen. The abrasive particles and carbon black having an average particle size of about 1 μm which were prepared in a ratio of 100:1 silicon carbide to carbon black and the mixture was fed at a rate of 15 g/min together with magnetic elements which passed through a No. 4 mesh screen but not through a No. 8 mesh screen using a magnetic field of sufficient intensity to fluidize the abrasive particles, the carbon black and the magnets. The carbon coated silicon carbide particles were useful as uniformly colored black abrasive particles.

In Example 41, silicon carbide abrasive particles were coated as in Example 40 except the coating material was epoxy powder as described in Example 1. The epoxy coated abrasive particles were useful as adherents to webs upon subsequent coating and heating steps.

In Example 42, a mixture of 100 parts aluminum oxide particles which passed through a No. 60 mesh screen but not through a No. 80 mesh screen and 5 parts of VP188 polyester urethane available from Ferro Corp. was fed at 23 g/min (3 lb/hr). The polymer coated aluminum oxide particles were useful to promote adherence to bonded nonwoven webs.

EXAMPLES 43–44 AND COMPARATIVE EXAMPLE 2

In Examples 43–44, substrates were coated with powders using the apparatus and procedure described in Examples 18–20.

In Example 43, Grade 1200 silicon carbide abrasive particles having an average particle volume size of 9.7 μm, available from Fujimi Co., were coated with CAB-O-SIL™ TS-530, a hydrophobic silicon dioxide having a surface area between 160 and 240 $m^2/g$ and particle size of about 0.2 μm, available from Cabot Corp. The abrasive particles and the silicon dioxide were premixed in a 100:2 ratio and the mixture was fed at a rate of 15.0 g/min. The flowability of the coated particles was improved over that of the uncoated particles when evaluated using the Jar test.

In Example 44, silicon carbide abrasive particles were coated with silicon dioxide as in Example 43 except the ratio was 100:1 abrasive particle to silicon dioxide. The coated particles flowed easily through a 630 μm slot.

In Comparative Example 2, uncoated Grade 1200 silicon carbide abrasive particles placed over a 630 μm slot and did not flow through the slot

EXAMPLES 45–46

In Examples 45–46, Grade 1200 silicon carbide abrasive particles were coated with titania having a particle size of less than 0.02 μm, available as T805 from Degussa Corp, using the apparatus and procedure described in Examples 18–20. In Example 45, 100 parts of the abrasive particles and 2 parts of the titania particles were mixed and fed at a rate of 15.0 mg/min. In Example 46, 100 parts of the abrasive particles and 1 part of the titania particles were premixed and fed at a rate of 15.0 mg/min. The titania coated abrasive particles had improved flowability over uncoated particles when tested by the jar method.

EXAMPLE 47 AND COMPARATIVE EXAMPLE 3

In Example 47, Grade 3000 silicon carbide abrasive particles having an average volume diameter of 4.2 μm, available from Fujimi Co., were coated with CAB-O-SIL™ TS530 hydrophobic silicon dioxide using the apparatus and procedure of Example 13. The abrasive particles and the silicon dioxide were premixed in a 100:2 ratio and fed at a rate of 15.0 g/min to provide an abrasive particle to silicon dioxide ratio of 100:2. The coated particles flowed easily through a 630 μm slot.

In Comparative Example 3, uncoated Grade 1200 silicon carbide abrasive particles placed over a 3800 μm slot and did not flow through the slot.

EXAMPLE 48, COMPARATIVE EXAMPLES 4–5

Example 48 and Comparative Examples 4 and 5 were made as in Examples 18–20, except the cylinder was 46 cm (18 inches) in diameter, the substrate was pigment grade titania having an average particle diameter of 0.30 μm, available from DuPont, and the coating powder was alumina having an average particle diameter of 0.04 μm, available from Nanophase Materials. The weight ratio of powder to substrate was 1 to 100 and the materials were premixed in a Patterson-Kelley blender, for 30 min. before using, the feed rate of the mixture was 200 g/min. At least some of the nylon screens used were No. 50 mesh screens and 20 g of magnetic elements were used on top of each screen. All of the magnetic elements used were first coated with 5 percent POLYWAX™ 500, a low molecular weight polyethylene available from Petrolite, Tulsa, Okla., to smooth the irregular surfaces of the magnetic elements and make it easier to form a complete and uniform coating of alumina onto the titania particles. The cylindrical solenoid was powdered by 307 volts from a 60 hertz alternating current power supply. A small amount of titania was first passed through the operating apparatus to coat the initial group of magnetic elements with titania and to remove any sub-sized magnetic elements that may have been on any screen.

In Comparative Example 4, the size of the magnetic elements used were such that they could pass through a No. 30 mesh screen but not a No. 50 mesh screen, and all of the nylon screens were No. 50 mesh. After 50 grams of the mixture was introduced into the apparatus, it was noticed that little was coming out and the No. 50 mesh screens were clogged.

Comparative Example 5, coated particles were made as in Comparative Example 4, except the top 5 screens were replaced with 30 mesh screens, the magnetic elements on top of each 30 mesh screen were replaced with 20 g of magnetic elements that passed through a No. 12 mesh screen but not a No. 30 mesh screen, and several 1 mm by 1 cm magnetic elements prepared from PLASTIFORM™ magnetic material, that had been previously coated with TEFLON™ at a thickness of 25 μm, were placed on each of the No. 30 mesh screens. After 100 grams of the mixture was introduced into the apparatus, it was noticed that little was coming out and the top No. 50 mesh screen was clogged.

Example 48 was made as Comparative Example 5, except, screens No. 6 and No. 7 were replaced with No. 30 mesh screens and the magnetic elements on top of each new screen were replaced with 20 g of magnetic elements that passed through a No. 12 mesh screen but not through a No. 30 mesh screen, and several 1 mm by 1 cm magnetic elements, that had been previously coated with TEFLON™ at a thickness of 25 μm, were also placed on each of the No. 50 mesh screens. After 50 grams of the mixture was introduced into the apparatus, it was noticed that the mixture seemed to be flowing well. The process was run for 90 min. with no apparent clogging of the screens.

As illustrated in Example 48, some combinations of substrates and powders can be processed more efficiently when the magnetic elements are of more than one size distribution. In particular, the presence of a few large magnetic elements on each space minimizes the screen plugging tendency of some powders that tend to clump under atmospheric conditions.

EXAMPLE 49

In Example 49, 15 g/min of a mixture of 100 parts silicon carbide, as described in Example 43, and 1 part of silica dioxide powder, as described in Example 43 was fed at 15.0 g/min by vibratory feeder into a horizontally positioned PYREX™ glass tube, approximately 90 cm long and having an inside diameter of about 30 mm. Magnetic field generators which were C-frame motor stators attached to a variable transformer having an 8 amp 110 volt, 60 hertz alternating current power supply, surrounding a portion of the tube length. Magnetic elements which passed through a No. 1 mesh screen but not through a No. 30 mesh screen, were placed on and adhered magnetically to a continuous PLASTIFORM™ belt formed by taping the ends of a strip together that was approximately 110 cm long and approximately 25 mm wide. The mixture and the magnetic elements were carried into the beginning of the tube where they were fluidized by the magnetic field. At the output end, the ground magnetic elements were carried from the end of the tube where they again were drawn by magnetism into clumps on the belt, and carried back to the beginning of the tube where they were again fluidized. The belt was driven at a rate of 1 m/min. The particles with the powder adhered to the surface, fell off the belt and into a receptacle as the belt left the tube and began its return trip to the beginning of the tube. The powder adhered sufficiently to the surface of the substrate such that the coated substrate now flowed easily.

EXAMPLE 50

In Example 50, 1 g of epoxy powder, 5 g of magnetic elements, which would pass through a No. 30 mesh screen but not a No. 50 mesh screen, and a 3 cm long piece of 8 mm diameter steel reinforcing rod for concrete, available as Rebar from Ambassador Steel Corp., Minneapolis, Minn. was placed in a 1 cm diameter 20 mL flint glass jar with a magnetic field generator, a C-frame motor stator, surrounding a portion of the jar length. The powder was fluidized in a 60 hertz oscillating magnetic field, created when an 8 amp, 110 volt alternating current power supply was attached through a variable transformer to the C-frame motor stator and sufficient voltage was used, for 60 sec and was affixed to the surface of the steel rod. The steel rod with epoxy particles adhered to its surface was removed from the jar and heated at 100° C. for 10 min, removed and examined. The epoxy was found to have coated the entire surface of the steel rod.

Example 50 illustrates that substrates such as steel reinforcing rods, usually epoxy coated by other methods for corrosion resistance, can be coated satisfactorily by epoxy powder that is both fluidized and hammered onto the surface of the rods by rapidly moving magnetic elements in an oscillating magnetic field. The rods could readily be coated continuously by carrying them sequentially into and out of the fluidized epoxy powder.

EXAMPLE 51

In Example 51, fibers coated with magnetic powder were prepared using γ-$Fe_2O_3$ powder available from ISK Magnetics and the fiber coating apparatus set up and run as described in Example 1–4. Trilene 10 pound fishing line (Berkeley, Inc. Clearwater, Iowa), Type IM7 carbon tow having a hard surface (Hercules, Inc.), with each carbon fiber having a generally circular cross-section about 5 μm in diameter, and sewing thread were each separately passed at 1 m/min through a series of 4 PYREX™ substantially spherical glass chambers, each having an inside diameter of about 25 mm and openings 1 mm in diameter at opposing sides of the chambers for passage of the fiber. Each chamber was provided with a single magnetic field generator that surrounded a portion of the chamber length. The field generators were C-frame motor stators obtained by removing the armature from a C-frame electric motor. They were powered by a variable transformer having 8 amp, 120 volt, 60 hertz capacity.

γ-$Fe_2O_3$ (iron oxide) powder, average particle diameter about 5 μm available from ISK, was fed at a rate of 100 mg/min., by a vibratory feeder, Model 25A, available from Eriez Magnetics, Inc., into each chamber through a separate opening. Approximately 5 g of magnetic elements were confined in each of the chambers. The magnetic elements were selected such that they passed through a No. 30 mesh screen but not a No. 50 mesh screen to provide magnetic elements having a short dimension of about 2 mm and long dimension of about 3 mm.

The voltage from a variable alternating current transformer, plugged into an 8 amp, 110 volt, 60 hertz direct current outlet and attached to each stator, was raised from 0 to about 20 volts so that the resulting 60 hertz oscillating magnetic field caused the magnetic elements to move enough to fluidize the powder and cause the powder to become affixed to the fiber. Each of the iron oxide coated fibers was tested to determine the magnetic character by picking up each of the fibers with a rare earth hand magnet.

EXAMPLE 52

In Example 52, magnetic particles were first coated with polyurethane and then used to prepared silica onto glass bubbles. The sample was prepared using the same type of chamber, magnetic field generators, vibration means, stators and power supply as in Example 27. The magnetic elements used were PLASTIFORM™ magnetic particles and were used in an amount of 5 g placed on top of each screen. The magnetic field intensity was such that the substrates and particles were fluidized.

The material used to coat the pre-classified magnets was Bayer Bayhydrol 21. The magnets were coated in a Freund Granulator, Model CF-360 (Freund Industrial Co., LTD Tokyo, Japan). Slit air was set to 250° F. for at least 45 minutes prior to the run. The air pressure was set at 40–60 psi. The atomizing air was set at 1.5 on the atomizing air gauge. The polyurethane was fed into the granulator at a feed rate of 20 ml/min. Spray time was between 30–45 minutes.

The resultant coated magnets were then used to prepare samples using the same type of chamber, magnetic field generators, vibration means, stators and power supply as in Example 9 and the following coating conditions: 6" coater, 150 volts, power, 7 screens, 20 grams magnets/screen. The substrate was fragile SCOTCHLITE™ K20 hollow glass spheres having an average outer diameter of 60 $\mu$m and an average wall thickness of 0.8 $\mu$m, available from 3M Company, which were continuously fed at 10 mg/min.

The hollow glass spheres and CAB-O-SIL™ TS720 hydrophobic silica powder having a surface area of between about 80 and 120 $m^2/g$ and particle size of about 0.02 $\mu$m, available from Cabot Corp., were premixed in a ratio of 100:1 pellets:powder and the mixture was fed at a rate of 500 mg/min. A uniform coating was obtained as observed by SEM analysis (JEOL-35C) and no discoloration of the final product was observed.

Under the same coating conditions (6" coater, 150 volts, power, 7 screens, 20 grams magnets/screen) and using uncoated magnets, a brown discoloration due to broken magnets coated onto the glass spheres was observed.

The principles, preferred embodiments, and modes of operation of the present invention have been described herein. The invention is not to be construed as limited to the particular forms disclosed, since these are to be regarded as illustrative rather than restrictive. Variations and changes may be made by those skilled in the art without departing from the spirit of the invention.

What is claimed is:

1. A process for adhering a coating material to a substrate, comprising the steps of:

(a) providing a bipolar oscillating magnetic field, (b) continuously introducing into the magnetic field a coating material and a substrate, in the presence of a means of affixing the coating material to the substrate by fluidizing at least the coating material and providing sufficient force to cause the coating material to adhere to the surface of the substrate, wherein a coated substrate is formed, and (c) continuously collecting the coated substrate.

2. The process according to claim 1 wherein the affixing means is a magnetic coating material.

3. The process according to claim 2 wherein the magnetic character bearing coating materials are magnetic powders.

4. The process according to claim 1 wherein the affixing means are magnetic elements.

5. The process according to claim 4 wherein the coating material is silica or titania and the substrate is silicon carbide or aluminum oxide.

6. The process according to claim 4 wherein the coating material is an epoxy compound.

7. The process according to claim 4 wherein the coating material is algae.

8. The process according to claim 4 wherein the coating material is a precious metal selected from the group consisting of gold, silver and platinum.

9. The process according to claim 4 wherein the coating material is a magnetic material.

10. The process according to claim 9 wherein the magnetic powder has a coercivity in the range of about 200 to 5000 oersteds.

11. The process according to claim 9 wherein the magnetic powder is gamma iron oxide, cobalt doped gamma iron oxide, hard barium ferrite, AlNiCo, a rare earth metal or a ceramic.

12. The process according to claim 9 wherein the magnetic powder has a size in the range of about 0.05 to 5 $\mu$m.

13. The process according to claim 4 wherein the magnetic elements comprise magnetic powder in a polymeric matrix.

14. The process according to claim 4 wherein the magnetic elements comprise particulate material having a particle size in the range of about 0.005 $\mu$m to 1 cm.

15. The process according to claim 4, wherein the magnetic elements are coated prior to use as the affixing means.

16. The process according to claim 1 wherein the substrate is a fragile material selected from hollow glass spheres, aluminum flakes, mica flakes, and foam materials.

17. The process according to claim 1 wherein the coating material is iron oxide and the substrate is polyester film.

18. The process according to claim 1 wherein the magnetic field is generated by a power source selected from the group consisting of single phase oscillators, single phase oscillator/amplifier combinations, single phase solid-state pulsing devices and single phase motor generators.

19. The process according to claim 1 wherein the magnetic field is generated by at least one stator powered by an alternating current supply through a single phase transformer.

20. The process according to claim 1 wherein the magnetic field has an intensity of between about 100 and 3000 oersteds.

21. The process according to claim 1 wherein the oscillating magnetic field has a frequency between about 5 to 1,000,000 hertz.

22. The process according to claim 1 wherein the substrate is hard fracturable material selected from the group consisting of solid glass beads, roofing granules and abrasive particles.

23. The process according to claim 1 wherein the coating material has an average diameter of less than 100 $\mu$m.

24. The process according to claim 1 wherein the substrate is a continuous linear material.

25. The process according to claim 24 wherein the continuous linear substrate is polymeric film, tow, wire, rope, twine, flexible tubing, screening or fabric.

26. The process according to claim 1 wherein the substrate is particulate material.

27. The process according to claim 26 wherein the particulate material is a hard metallic material.

28. The process according to claim 1 wherein the coating material size is in the range of 0.005 to 500 $\mu$m.

29. The process according to claim 24 wherein the substrate particle size is in the range of 0.005 to 500 $\mu$m.

30. The process according to claim 1 wherein the weight ratio of substrate to coating material can range from about 500:1 to 1:20.

31. The process according to claim 30 wherein the magnetic elements are of at least two distinctive size ranges.

32. The process according to claim 1 wherein the substrate is soft material selected from the group consisting of a polymeric film, polymeric beads, corn starch, epoxy powder and fabric.

33. The process according to claim 32 wherein the abrasive granules are heat treated or fused aluminum oxide, silicon carbide, alumina, zirconia, silica, boron carbide, garnet and combinations thereof.

* * * * *